(12) United States Patent
Kadiyala et al.

(10) Patent No.: US 8,913,263 B2
(45) Date of Patent: Dec. 16, 2014

(54) PAGE LEVEL RECOVERY GRAPHICAL USER INTERFACE

(71) Applicants: Kumar Venkata Kadiyala, Boulder, CO (US); Gerald Donald Boldt, Longmont, CO (US); Steven Mark Gebert, Boulder, CO (US); Michael David Raines, Austin, TX (US)

(72) Inventors: Kumar Venkata Kadiyala, Boulder, CO (US); Gerald Donald Boldt, Longmont, CO (US); Steven Mark Gebert, Boulder, CO (US); Michael David Raines, Austin, TX (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/779,060

(22) Filed: Feb. 27, 2013

(65) Prior Publication Data

US 2014/0240738 A1    Aug. 28, 2014

(51) Int. Cl.
    *G06F 3/12*       (2006.01)
    *G06K 15/00*      (2006.01)
(52) U.S. Cl.
    CPC .................................... *G06K 15/408* (2013.01)
    USPC ............................ 358/1.13; 358/1.14; 399/19
(58) Field of Classification Search
    USPC ........... 358/1.13, 1.14, 1.15, 403; 399/18, 19, 399/82
    See application file for complete search history.

(56) References Cited

U.S. PATENT DOCUMENTS

| | | | |
|---|---|---|---|
| 5,625,757 A * | 4/1997 | Kageyama et al. | 358/1.14 |
| 7,864,350 B2 | 1/2011 | Endo et al. | |
| 8,218,172 B2 | 7/2012 | Kato | |
| 8,331,808 B2 | 12/2012 | Kaneda | |
| 2002/0136564 A1* | 9/2002 | Takamine et al. | 399/82 |
| 2003/0086115 A1* | 5/2003 | Bhatti | 358/1.15 |
| 2004/0046986 A1* | 3/2004 | Kuwabara et al. | 358/1.14 |
| 2004/0236789 A1* | 11/2004 | Uchida et al. | 707/104.1 |
| 2006/0224559 A1* | 10/2006 | Abiko | 707/1 |
| 2007/0013963 A1* | 1/2007 | Nakamura | 358/403 |
| 2007/0236723 A1* | 10/2007 | Gaertner et al. | 358/1.15 |
| 2008/0259387 A1 | 10/2008 | Hirai | |
| 2009/0033992 A1 | 2/2009 | Ogiwara et al. | |
| 2009/0161140 A1* | 6/2009 | Devries | 358/1.14 |
| 2010/0097651 A1* | 4/2010 | Hagiwara | 358/1.15 |
| 2010/0328718 A1* | 12/2010 | Takahashi | 358/1.15 |
| 2011/0141507 A1* | 6/2011 | Kawaura | 358/1.13 |
| 2011/0249290 A1* | 10/2011 | Hayber et al. | 358/1.15 |
| 2012/0200886 A1* | 8/2012 | Yamaguchi | 358/1.15 |
| 2012/0218587 A1 | 8/2012 | Koike | |

* cited by examiner

*Primary Examiner* — David S Cammack
(74) *Attorney, Agent, or Firm* — Blakely, Sokoloff, Taylor & Zafman LLP

(57) ABSTRACT

A print server includes a graphical user interface (GUI) having a dialog screen to enable the user to specify a page range of a current copy and a number of additional copies of a print job to be re-printed upon occurrence of an unrecoverable error during printing of the print job.

19 Claims, 4 Drawing Sheets

PAGE LEVEL RECOVERY GRAPHICAL USER INTERFACE

FIELD OF THE INVENTION

The invention relates generally to the field of printing systems. More particularly, the invention relates to printer interfaces.

BACKGROUND

Typically, printing from a computer system occurs through the use of a printer driver. A printer driver is a piece of software that converts data to be printed to a form specific to a printer, which allows an application to perform printing without being aware of the technical details of each printer model. Upon either an application launch or during a print command load time, the application will call an instance of the printer driver and provide the user with a graphical user interface (GUI) to set the desired printer driver settings.

Often during printing a job is unable to be completed for one of various reasons. In some instances, a job can automatically resume printing upon the occurrence of an error. For example, upon the occurrence of a hardware error (e.g., errors like paper jam or tray empty), the job resumes automatically once the error is fixed on the printer.

Another problem may involve network/communication problems between a TotalFlow Production Manager (TFPM) print connector and the hardware. In this example, the job will be in an error state and may not have the actual number of pages printed. The job may have completed printing without the TFPM being aware. A manual option is provided in this instance to resume the job if the printing did not complete.

However in other situations, the job may not be able to automatically resume on the printer, and the TFPM cannot automatically resume the job due to being unaware of the exact number of pages printed.

Accordingly, a mechanism to reprint remaining pages and copies of a job upon the occurrence of an error is desired.

SUMMARY

In one embodiment, a print server includes a graphical user interface (GUI) having a dialog screen to enable the user to specify a page range of a current print request and a number of additional copies of a print job to be re-printed upon occurrence of an unrecoverable error during printing of the print job.

In another embodiment a method is disclosed. The method includes displaying a graphical user interface (GUI) having a dialog screen, detecting a number entered into a copies menu component of the dialog screen indicating additional copies of a print job to be re-printed after occurrence of an unrecoverable error and detecting a page range entered into a pages menu component indicating pages of a current copy of a print job to be re-printed after the occurrence of the unrecoverable error.

Another embodiment discloses a computer system including a memory to store a printer driver program a processor coupled to the memory to execute the printer driver program and a display device to display a graphical user interface (GUI) upon the processor executing the printer driver program. The GUI includes a dialog screen to enable the user to specify a page range of a current print request and a number of additional copies of a print job to be re-printed upon occurrence of an unrecoverable error during printing of the print job.

BRIEF DESCRIPTION OF THE DRAWINGS

A better understanding of the present invention can be obtained from the following detailed description in conjunction with the following drawings, in which.

DETAILED DESCRIPTION

A page level recovery GUI is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
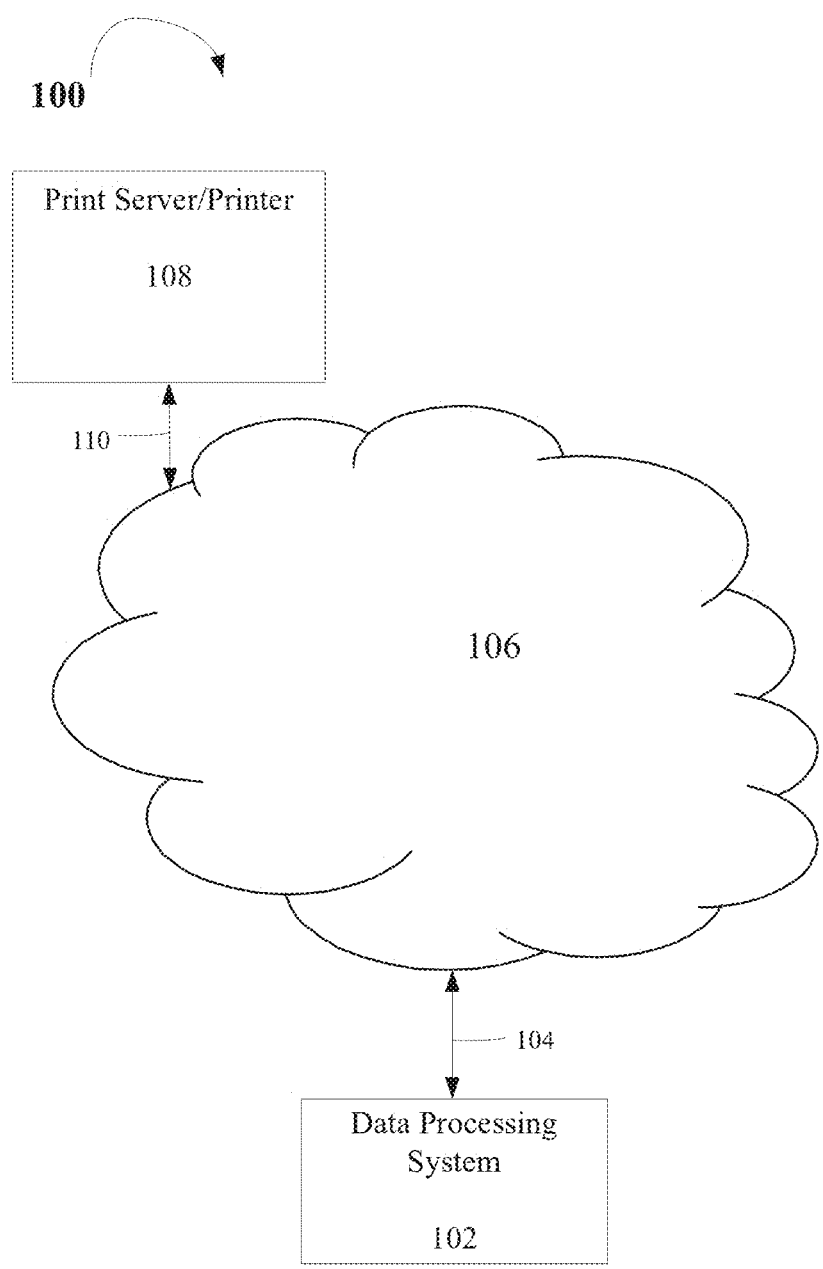
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server/printer 108 serving print requests over network 106 received via communications link 110 between print server/printer 108 and network 106. The operating system on data processing system 102 is capable of selecting print server/printer 108 and submitting requests for services to print server/printer 108 over network 106. Print server/printer 108 includes a print queue for print jobs requested by remote data processing systems 102. Further, print server/printer 108 includes a control unit 109 to perform operations associated with printing a request.

Although described as incorporated within the same entity, other embodiments may include the print server and the printer as being physically separate components. Therefore, the data processing system network 100 depicted in FIG. 1 is selected for the purposes of explaining and illustrating the present invention and is not intended to imply architectural limitations. Those skilled in the art will recognize that various additional components may be utilized in conjunction with the present invention.

According to one embodiment data processing system 102 implements a printer driver to facilitate the printing of print jobs to print server/printer 108. Specifically, the printer driver may include a GUI dialog screen that enables a system operator (or user) to select from one or more print options to print a job. However, printer drivers with conventional GUI dialog screens are limited in their ability to re-print jobs that have been interrupted because of an error.

Figure 2:
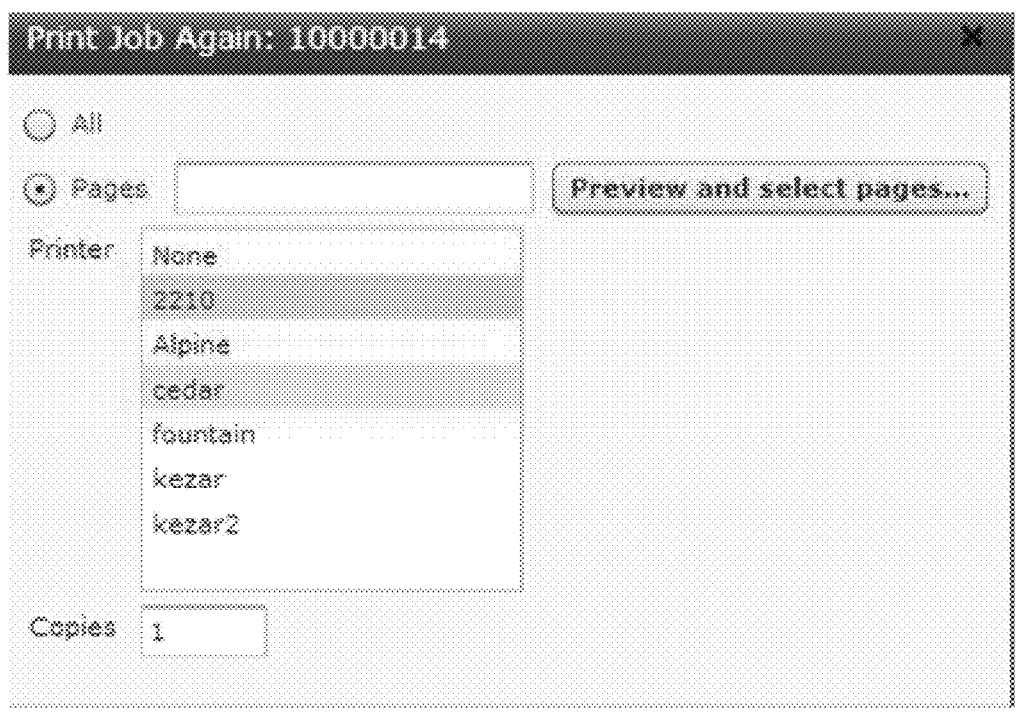
FIG. 2 is a screen shot of a conventional GUI.

FIG. 2 is a screen shot of a conventional GUI dialog screen, which has the above-disclosed limitations. As shown in FIG. 2, the user needs to know the last page printed to properly re-print a document, and may need to invoke the dialog screen more than once. A typical scenario illustrating such a limitation is when a small job (e.g., a brochure) having five pages with a high copy count of 500 is submitted.

In such a scenario, a non-recoverable mechanical problem may occur at the printer during printing of the 400th copy, after printing 3 pages. Using the conventional GUI dialog screen, the user must select and enter the remaining pages (4 and 5), with a hyphen character, of the current copy being printed and execute the print job. Subsequently, the user must reopen the dialog screen to select the all option in order to print 100 more copies. Such a process is inefficient, as well as inconvenient.

According to one embodiment, a printer driver includes a page level recovery GUI to enable a user to re-print a job. A data processing system 102, or server 108, includes a print driver having a GUI dialog screen that provides an option to enable the user to specify a page range of a current copy, as well as the remaining copies, to be re-printed. In such an embodiment, the dialog screen will allow the operator to print a selected number of copies (x) of the entire job and/or a selected number of copies (y) of a set of pages.

Figure 3:
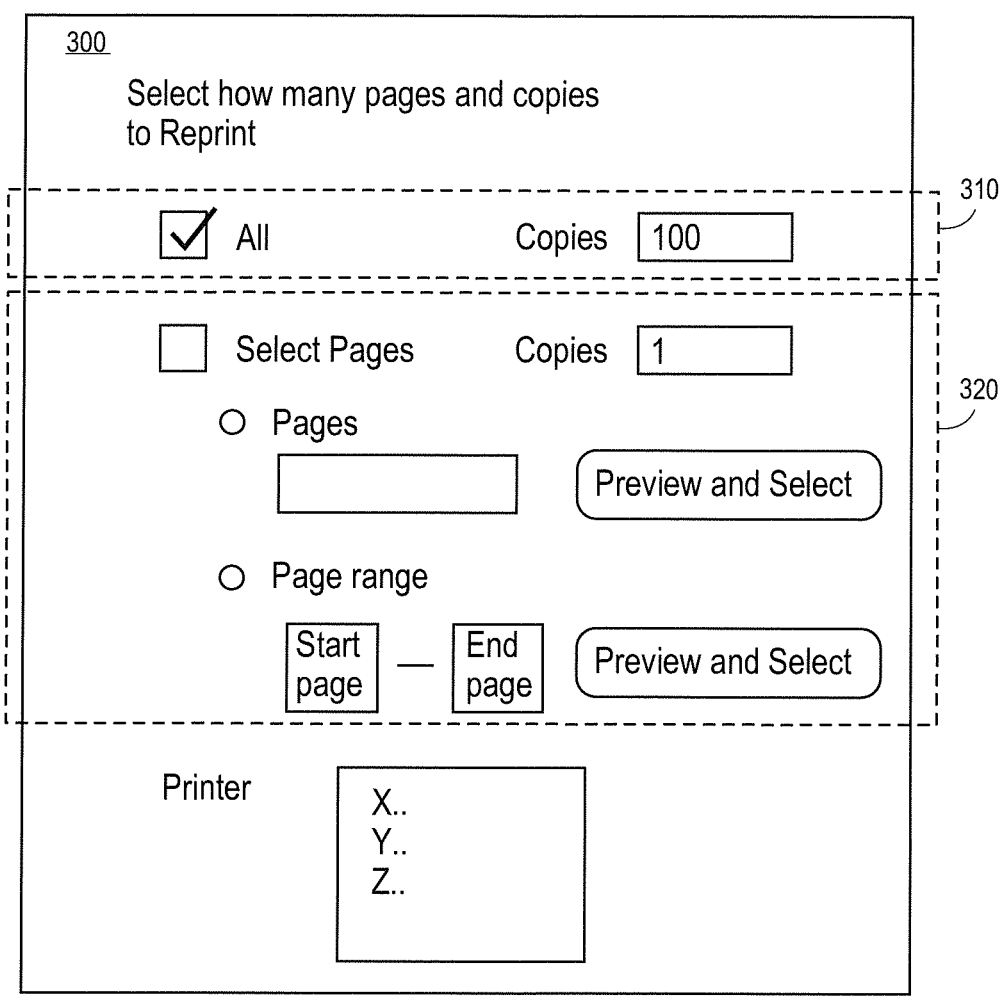
FIG. 3 is a screen shot of one embodiment of a GUI.

FIG. 3 is a screen shot of one embodiment of a GUI dialog box 300. Dialog box 300 includes a copies menu component 310 having boxes that enables a user to select a number of copies of the full print job that is to be re-printed. In one embodiment, the number of copies x to be re-printed defaults to the remaining number of copies to print, with the user being given the option to change that number.

Further, dialog box 300 includes a pages menu component 320, that enables the user to select from among options to re-print pages from the copy that was being printed when the error occurred. The pages menu component 320 includes buttons and boxes that provide an option to enable selection of a set of pages from a number of copies of partial pages to re-print, as well as a number of copies of the pages to re-print. In one embodiment, the number of copies is set to a default of one. A user may select a box indicating that specific pages are to be re-printed and subsequently enter those pages.

The pages menu component 320 also includes buttons and boxes that provide an alternative option for the user to enter the range of pages in the current job that are to be re-printed. In this option the user can enter the page ranges without having to type a hyphen character. Further, the pages menu component 320 includes a preview and select button option, which when selected, enables the user to preview the actual pages to be re-printed. Finally, dialog box 300 includes a printer selection option that allows the user to select from amongst various printers 108 to re-print the job.

Implementation of dialog box 300 based on the above-described scenario would enable the user, after inspection of the printed output, to re-print the job by interfacing with the copies menu component 310 to print the remaining 100 copies and the pages menu component 320 to re-print 1 copy of the remaining 2 pages of the current copy, all with one step.

Figure 4:
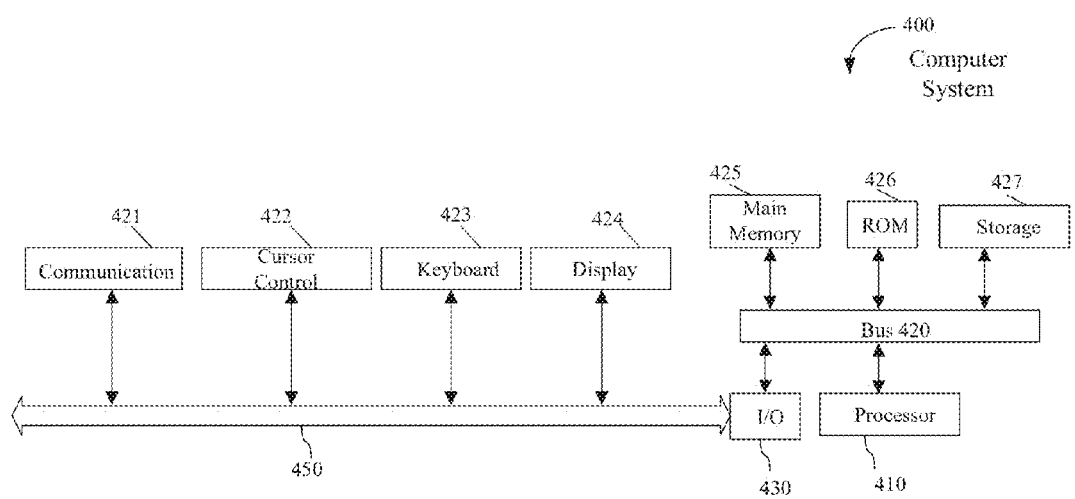
FIG. 4 illustrates one embodiment of a computer system.

FIG. 4 illustrates a computer system 400 on which data processing system 102 and/or server 108 may be implemented. Computer system 400 includes a system bus 420 for communicating information, and a processor 410 coupled to bus 420 for processing information.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 427 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients). The communication device 421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A print server comprising:
   a storage device to store a graphical user interface (GUI): and a processor to execute the GUI to display a dialog screen to enable specification of a page range of a current copy and a number of additional copies of a print job to be re-printed upon occurrence of an unrecoverable error during printing of the print job and to facilitate the re-print of the print job to include pages specified in the page range and the specified number of additional copies.

2. The printer server of claim 1 wherein the dialog screen enables a user to print a selected number of copies of the entire job and a selected number of copies of a set of pages to be re-printed.

3. The printer server of claim 2 wherein the dialog screen comprises a copies menu component that enables the user to select a number of copies of the full print job that is to be re-printed.

4. The printer server of claim 3 wherein the dialog screen comprises a pages menu component that enables the user to select from among options to re-print pages from the copy that was being printed when the error occurred.

5. The printer server of claim 4 wherein the pages menu component comprises buttons and boxes that provide an option to enable selection of a set of pages from a number of copies of partial pages to reprint and a number of copies of the pages to re-print.

6. The printer server of claim 4 wherein the pages menu component comprises a page range option to enable the user to enter a range of pages in the current job that are to be re-printed.

7. The printer server of claim 4 wherein the pages menu component comprises a preview and select button option to enable the user to preview pages to be re-printed.

8. The printer server of claim 3 wherein the dialog screen further comprises a printer selection option to enable the user to select from amongst various printers to re-print the print job.

9. A computer system comprising:
a memory to store a print server program;
a processor, coupled to the memory, to execute the printer server program; and
a display device to display, upon occurrence of an unrecoverable error during printing of a print job, a graphical user interface (GUI) upon the processor executing the printer server program, the GUI having a dialog screen to enable concurrent specification of a page range of a current copy of the print job which was being printed at the time of occurrence of the unrecoverable error, and a number of additional copies of the entire print job to be re-printed,
the processor further to facilitate submission of a request for concurrent re-printing of the pages specified in the page range of the print job and the specified number of additional copies of the print job.

10. The computer system of claim 9 wherein the dialog screen enables a user to print a selected number of copies of the entire job and a selected number of copies of a set of pages to be re-printed.

11. The computer system of claim 10 wherein the dialog screen comprises a copies menu component that enables the user to select a number of copies of the full print job that is to be re-printed.

12. The computer system of claim 11 wherein the dialog screen comprises a pages menu component that enables the user to select from among options to re-print pages from the copy that was being printed when the error occurred.

13. The computer system of claim 12 wherein the pages menu component comprises buttons and boxes that provide an option to enable selection of a set of pages from a number of copies of partial pages to reprint and a number of copies of the pages to re-print.

14. The computer system of claim 12 wherein the pages menu component comprises a page range option to enable the user to enter a range of pages in the current job that are to be re-printed.

15. The computer system of claim 12 wherein the pages menu component comprises a preview and select button option to enable the user to preview pages to be re-printed.

16. The computer system of claim 11 wherein the dialog screen further comprises a printer selection option to enable the user to select from amongst various printers to re-print the print job.

17. A method comprising:
displaying, upon occurrence of an unrecoverable error during printing of a print job, a graphical user interface (GUI) having a dialog screen;
detecting a number entered into a copies menu component of the dialog screen indicating additional copies of the entire print job to be re-printed; and
detecting a page range entered into a pages menu component indicating pages to be re-printed of a current copy of the print job which was being printed at the time of occurrence of the unrecoverable; and
submitting a request from the dialog screen for concurrent re-printing of the pages of the detected page range and the detected number of additional copies of the entire print job.

18. The method of claim 17 wherein the pages menu component comprises buttons and boxes that provide an option to enable selection of a set of pages from a number of copies of partial pages to reprint and a number of copies of the pages to re-print.

19. The method of claim 17 wherein the pages menu component comprises a page range option to enable the user to enter a range of pages in the current job that are to be re-printed.

* * * * *